(12) United States Patent
Mariller

(10) Patent No.: US 10,207,860 B2
(45) Date of Patent: Feb. 19, 2019

(54) CARTRIDGE FOR PREPARING A BEVERAGE

(71) Applicant: PSR Profitable Strategic Redeployment Sarl, Fribourg (CH)

(72) Inventor: Alain Mariller, Le Mont-Pèlerin (CH)

(73) Assignee: PSR PROFITABLE STRATEGIC REDEPLOYMENT SARL, Fribourg (CH)

( * ) Notice: Subject to any disclaimer, the term of this patent is extended or adjusted under 35 U.S.C. 154(b) by 656 days.

(21) Appl. No.: 13/853,042

(22) Filed: Mar. 28, 2013

(65) Prior Publication Data
US 2013/0291739 A1    Nov. 7, 2013

Related U.S. Application Data

(62) Division of application No. 12/675,592, filed as application No. PCT/IB2007/054490 on Nov. 6, 2007.

(30) Foreign Application Priority Data

Sep. 3, 2007    (WO) .................. PCT/IB2007/053542

(51) Int. Cl.
*B65D 85/804*    (2006.01)
*A47J 31/36*    (2006.01)
*B65D 65/46*    (2006.01)

(52) U.S. Cl.
CPC ...... *B65D 85/8043* (2013.01); *A47J 31/3628* (2013.01); *B65D 65/466* (2013.01)

(58) Field of Classification Search
None
See application file for complete search history.

(56) References Cited

U.S. PATENT DOCUMENTS

| 1,306,415 | A | | 6/1919 | Dunlap |
| 2,032,562 | A | * | 3/1936 | Burns ..................... A47J 17/04 |
| | | | | 30/113.3 |
| 2,292,101 | A | | 8/1942 | Brown |

(Continued)

FOREIGN PATENT DOCUMENTS

| EP | 1 364 605 | 11/2003 |
| EP | 1 440 909 | 7/2004 |

(Continued)

OTHER PUBLICATIONS

International Search Report for PCT/IB2007/054490, dated Sep. 5, 2008.

(Continued)

*Primary Examiner* — Ibrahime A Abraham
*Assistant Examiner* — Gyounghyun Bae
(74) *Attorney, Agent, or Firm* — Nixon & Vanderhye P.C.

(57) ABSTRACT

The invention relates to a cartridge for preparing a beverage, such as coffee, that comprises a hollow member for containing a dose of, for example, ground coffee, said hollow member comprising a side wall, an upper face and a lower face including an extraction membrane, said cartridge being characterized in that it further comprises several separate protrusions provided on said side wall and/or said upper wall, each protrusion including at least one perforation area. The invention also relates to a device for using said cartridge.

11 Claims, 6 Drawing Sheets

(56) References Cited

U.S. PATENT DOCUMENTS

| | | | |
|---|---|---|---|
| 3,309,980 A | 3/1967 | Bozek | |
| 4,205,571 A * | 6/1980 | Bertini | B23D 61/123 83/661 |
| 4,690,047 A * | 9/1987 | Balzano | A47J 25/00 30/128 |
| 4,903,407 A * | 2/1990 | Fischer | A47J 25/00 30/113.1 |
| 4,959,903 A * | 10/1990 | Daoust | A47J 17/04 30/114 |
| 4,995,310 A * | 2/1991 | van der Lijn | B65D 85/8043 210/282 |
| 5,472,719 A * | 12/1995 | Favre | A47J 31/0673 426/112 |
| 5,840,189 A * | 11/1998 | Sylvan | B65D 85/8043 210/233 |
| 5,937,524 A * | 8/1999 | Hornsby | B26B 3/00 30/113.1 |
| 6,079,315 A * | 6/2000 | Beaulieu | A47J 31/3628 99/289 R |
| 6,142,063 A * | 11/2000 | Beaulieu | A47J 31/32 99/283 |
| 6,213,302 B1 * | 4/2001 | Sanders | A23B 7/148 206/521.1 |
| 6,595,366 B1 * | 7/2003 | Brown | B65D 43/0222 206/525 |
| 6,786,351 B2 * | 9/2004 | Krueger | B65D 21/0219 206/508 |
| 6,834,818 B2 * | 12/2004 | Lee | A47J 43/0722 241/282.2 |
| 8,720,320 B1 * | 5/2014 | Rivera | A47J 31/0678 99/295 |
| 2001/0052294 A1 * | 12/2001 | Schmed | A47J 31/3628 99/295 |
| 2002/0078831 A1 * | 6/2002 | Cai | A47J 31/14 99/295 |
| 2002/0144604 A1 * | 10/2002 | Winkler | A47J 31/3695 99/302 R |
| 2002/0148356 A1 * | 10/2002 | Lazaris | A47J 31/0668 99/295 |
| 2003/0033938 A1 * | 2/2003 | Halliday | B65D 85/8043 99/275 |
| 2003/0172813 A1 | 9/2003 | Schifferle | |
| 2003/0217643 A1 | 11/2003 | Masek et al. | |
| 2003/0217644 A1 * | 11/2003 | Jarisch | A47J 31/3695 99/279 |
| 2005/0223904 A1 * | 10/2005 | Laigneau | A47J 31/3695 99/295 |
| 2006/0225575 A1 | 10/2006 | Denisart et al. | |
| 2006/0236871 A1 * | 10/2006 | Ternite | B65D 85/8043 99/295 |
| 2006/0260458 A1 * | 11/2006 | Friend | B23D 53/08 83/788 |
| 2007/0062375 A1 * | 3/2007 | Liverani | B65D 85/8043 99/279 |
| 2007/0175335 A1 * | 8/2007 | Liverani | B65D 85/8043 99/279 |
| 2008/0022637 A1 * | 1/2008 | Buchko | B65B 31/024 53/527 |
| 2008/0210697 A1 * | 9/2008 | Kessell | B65D 1/40 220/666 |
| 2008/0264267 A1 * | 10/2008 | Doglioni Majer | B65D 85/8043 99/295 |
| 2009/0280219 A1 * | 11/2009 | Yoakim | B65D 85/8043 426/77 |
| 2009/0320693 A1 * | 12/2009 | Ozanne | A47J 31/0673 99/295 |
| 2016/0068334 A1 * | 3/2016 | Cafaro | B65D 85/8043 426/115 |

FOREIGN PATENT DOCUMENTS

| | | |
|---|---|---|
| EP | 1 579 791 | 9/2005 |
| EP | 1580144 A1 | 9/2005 |
| EP | 1792849 A1 | 6/2007 |
| FR | 2 842 090 | 1/2004 |
| JP | 2001-026668 | 1/2001 |
| JP | 2003-265320 | 9/2003 |
| JP | 2006 063111 A | 3/2006 |
| JP | 2007-503231 | 2/2007 |
| WO | WO 2005/090196 A1 | 9/2005 |
| WO | WO 2006 030461 A1 | 3/2006 |
| WO | WO 2006/043096 | 4/2006 |

OTHER PUBLICATIONS

Written Opinion of the International Searching Authority for PCT/IB2007/054490, dated Sep. 5, 2008.

Japanese Office Action dated Apr. 17, 2012 and its English translation.

Webster's New World Dictionary, 3rd College Edition. 1988, Simon & Schuster. p. 85, 485, 1005.

Machine Translation of JP2001-026668 to Iwai, published Jan. 2001.

\* cited by examiner

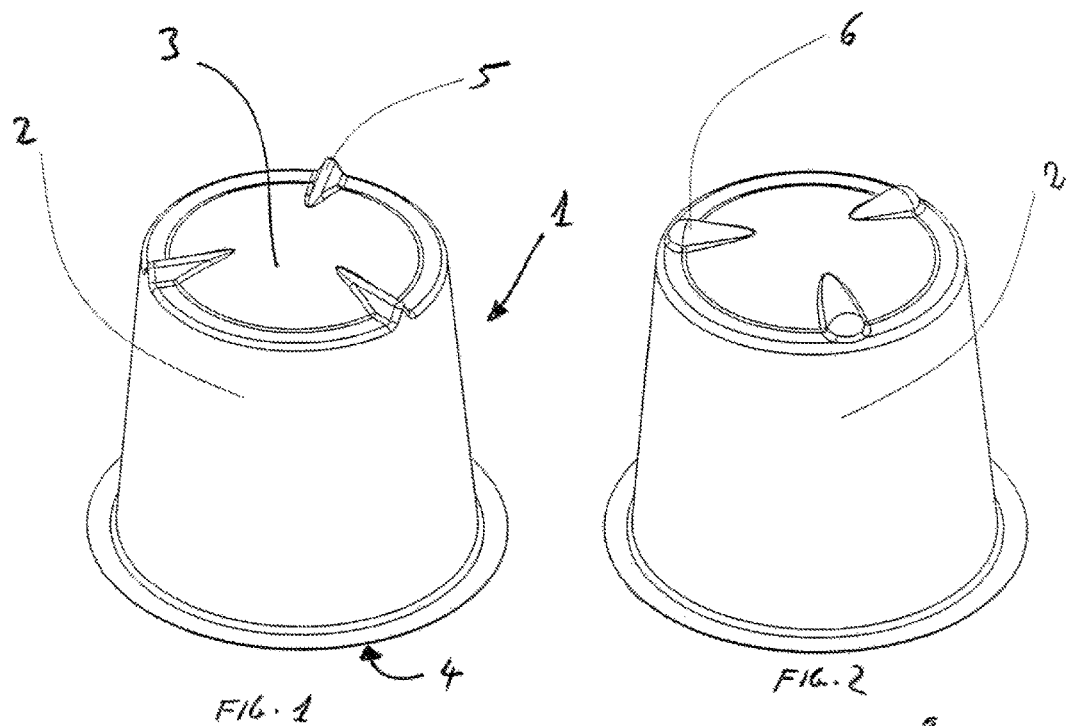
FIG. 1
FIG. 2
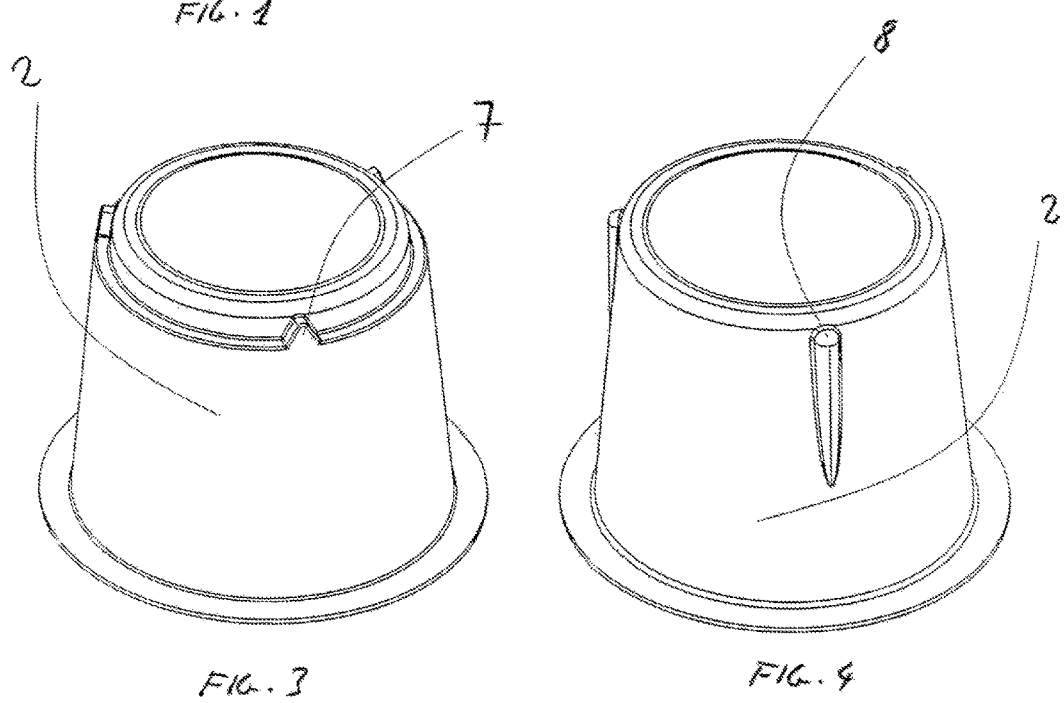
FIG. 3
FIG. 4

CARTRIDGE FOR PREPARING A BEVERAGE

This application is a divisional of application Ser. No. 12/675,592, filed Feb. 26, 2010, which is the U.S. national phase of International Application No. PCT/IB2007/054490 filed 6 Nov. 2007 which designated the U.S. and claims priority to IB Application No. PCT/IB2007/053542 filed 3 Sep. 2007, the entire contents of each of which are hereby incorporated by reference.

FIELD OF THE INVENTION

The present invention is situated in the field of preparing drinks, e.g. based on coffee, by extraction of a concentrated dose, e.g. of ground coffee, contained in a cartridge. It relates more particularly to the doses used for this purpose and to the devices using such doses.

DESCRIPTION OF THE PRIOR ART

Cartridges and machines operating according to the aforementioned principle have existed for many decades.

U.S. Pat. No. 2,899,886, U.S. Pat. No. 2,968,560, U.S. Pat. No. 3,403,617 and U.S. Pat. No. 3,607,297 describe devices in which the cartridge is initially perforated in several places, and then traversed by pressurized water.

The cartridge described in patent CH 605 293 or in patent EP 0 242 556 B1 comprises a membrane in its lower portion. Pressurized water is initially inserted into the upper portion of the cartridge, which causes a swelling of the cartridge, mainly at the membrane. At a certain pressure, the membrane tears, thereby allowing the water-coffee mixture to flow out.

Other cartridges furnished with a membrane are described in the following patent documents: EP 0 468 079 A, EP 0 806 373 A, EP 0 554 469 A.

SUMMARY OF THE INVENTION

One of the objects of the present invention lies in an improvement in the water-coffee mixture that occurs inside the cartridge.

This object is achieved by furnishing the side wall and/or the upper face of the cartridge with several protrusions which each comprise a perforation zone.

The protrusions are placed and designed so as to be perforated, preferably simultaneously, by a perforating element, e.g. a circular blade.

In the present invention, the protrusions may be formed by embossing, stamping, thermoforming or any other method adapted to the desired object.

The protrusions are characterized in that they form a relatively small surface area, in all cases much smaller than the total surface area of the side face and/or of the upper face of the cartridge. Moreover, the thickness of the wall at the protrusions is substantially identical to the thickness of the walls of the cartridge. The result of this is that the force of the perforating element per unit of surface area is particularly high at the protrusions. Therefore, when the perforating element is actuated, it is at the protrusions that the cartridge is pierced.

Note finally that without such protrusions, the cartridge could not be pierced.

DETAILED DESCRIPTION OF THE INVENTION

The invention is described in greater detail below by means of examples illustrated by the following figures:

FIG. 1 is a first example of a cartridge according to the invention

FIG. 2 is a second example of a cartridge according to the invention

FIG. 3 is a third example of a cartridge according to the invention

FIG. 4 is a fourth example of a cartridge according to the invention

Figure 5:
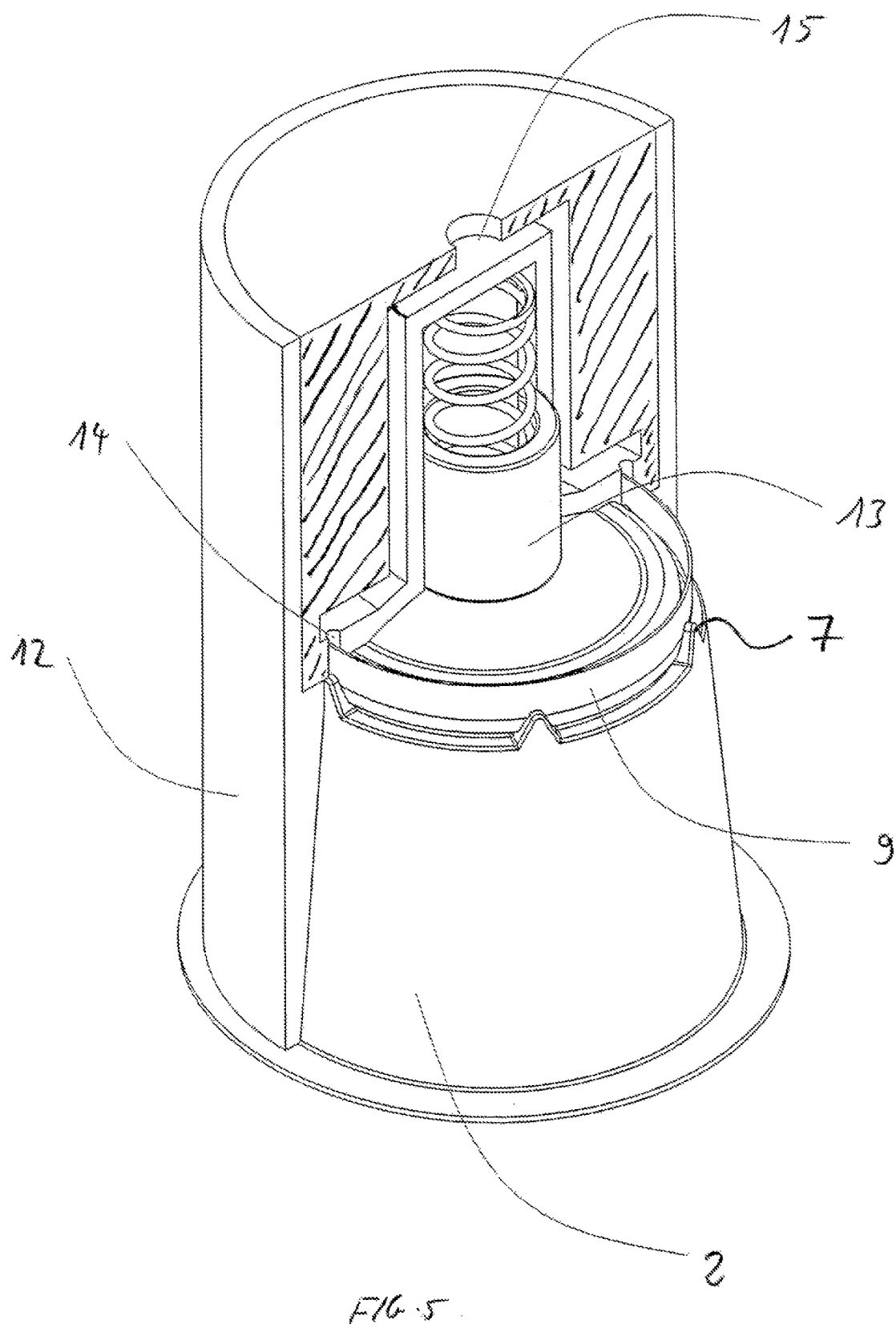
FIG. 5 illustrates schematically an example of a device using a cartridge according to the invention

FIGS. 1 to 4 illustrate cartridges comprising a hollow body 1, a side wall 2, an upper face 3 and a lower face 4, the latter comprising an extraction membrane (not illustrated).

As can be seen in FIGS. 1 and 2, the upper face 3 comprises a series of protrusions 5, 6.

The cartridge illustrated in FIG. 3 comprises a peripheral zone of annular shape that is placed at a lower level than the remaining surface of the upper face 3. In this cartridge, the protrusions 7 are placed on the periphery of the upper face 3.

FIG. 4 shows a cartridge in which the protrusions 8 are placed on the side wall 2.

According to a variant of the invention that is not illustrated, the protrusions are placed both on the upper face 3 and on the side wall 2.

Each protrusion 5-8 has at least one zone of sharp curvature, in order to create a zone of high pressure when a perforation element is applied to this zone.

FIG. 5 illustrates schematically a device comprising a perforation element in the form of an annular blade 9. The blade 9 is mounted in translation in a vertical direction in order to perforate the protrusions 7 when it is lowered.

In this device, the cartridge is held in place by means of a cartridge holder (retention block) 13 and a spring.

FIG. 5 also illustrates the path followed by the water prior to its entry into the cartridge via the protrusions 7. The water enters initially through an inlet orifice 15, is first housed in a space and then passes through a series of orifices 14 placed above the blade 9.

Figure 6:
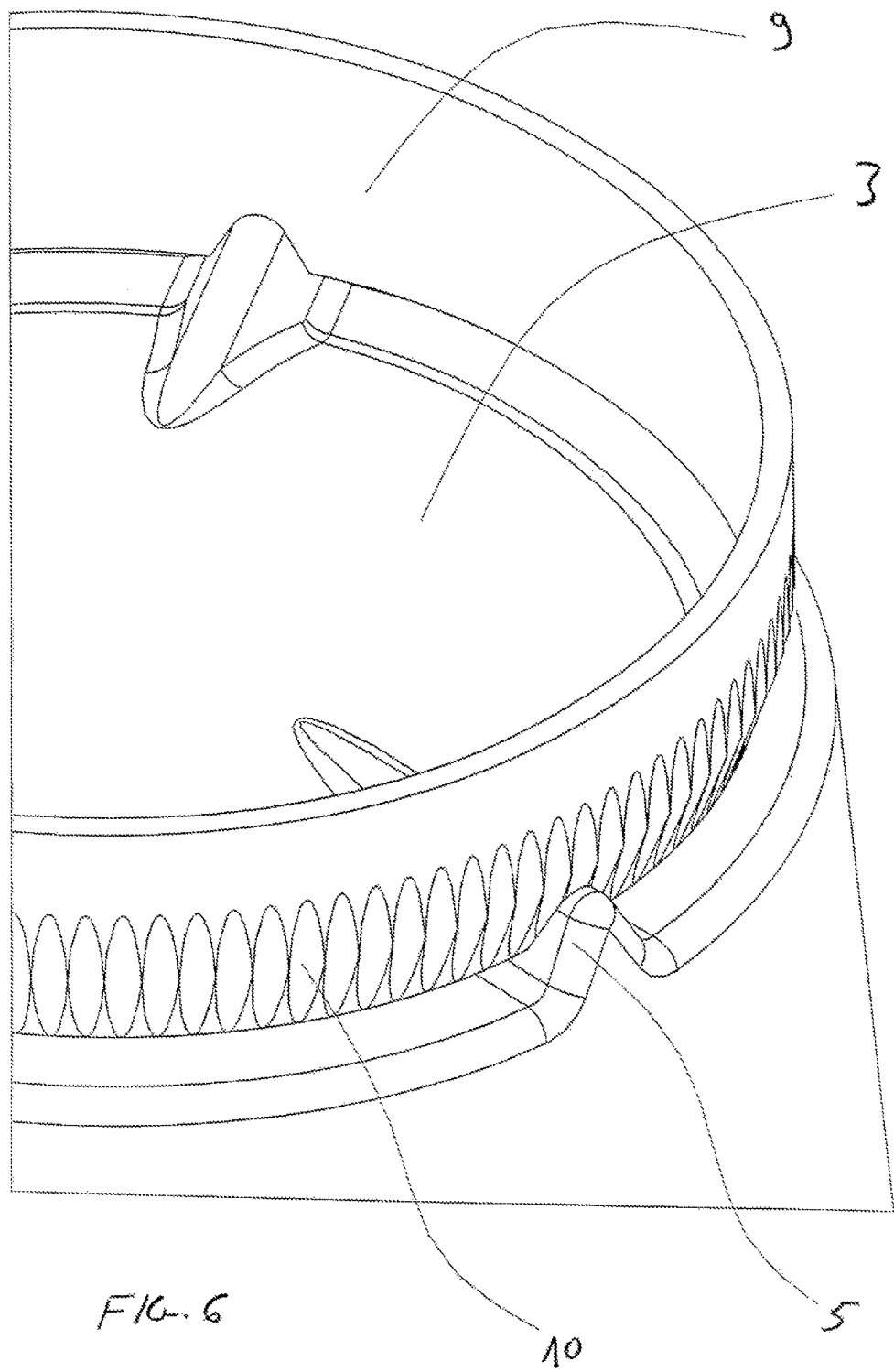
FIG. 6 shows an example of perforation of a cartridge according to the invention

FIG. 6 is an enlarged view of the blade 9 on which are placed blade reliefs 10, the object of which is in particular to ensure a better flow of the water through the perforations made in the protrusions.

Figure 7:
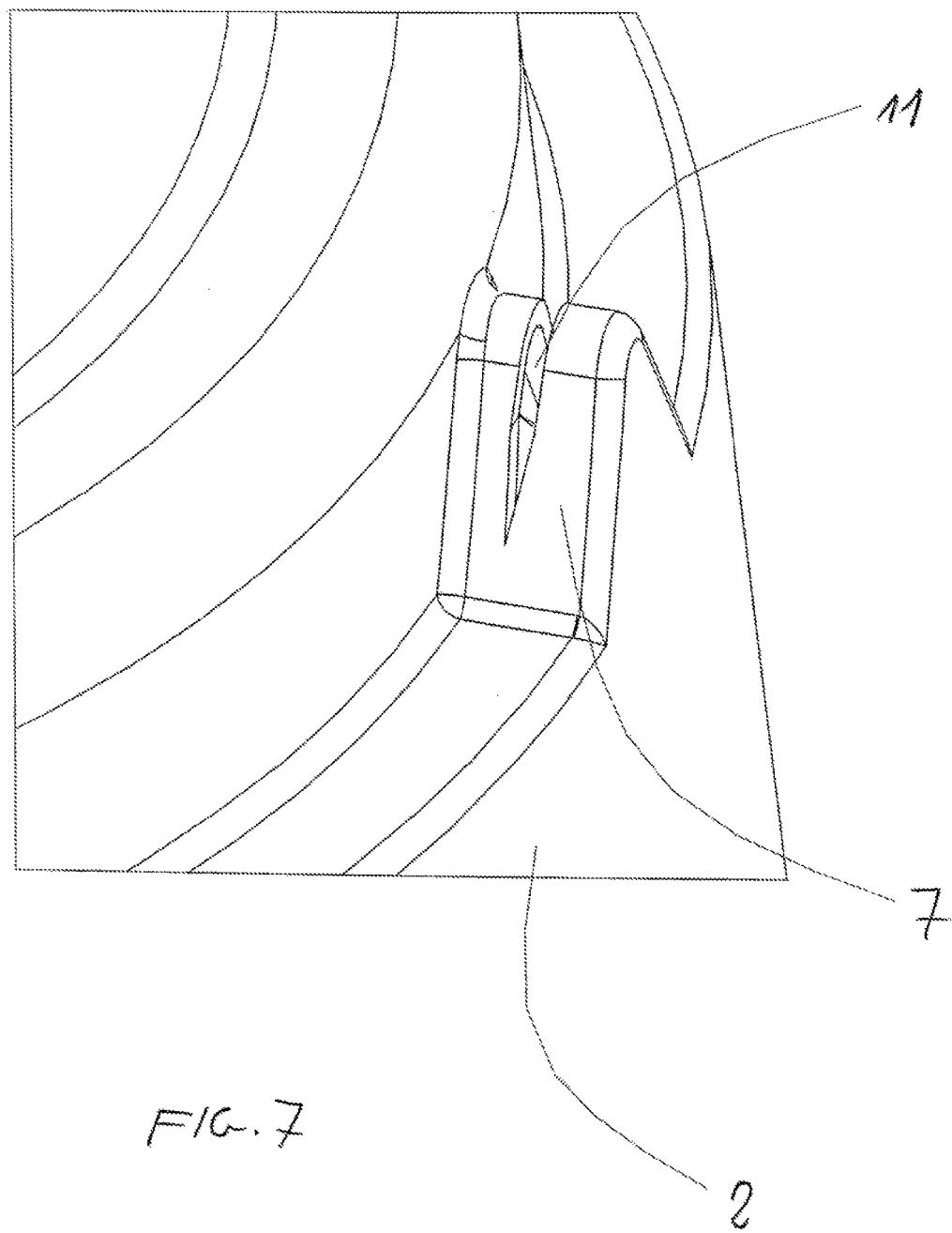
FIG. 7 shows an embossing according to the invention, after having sustained a perforation

FIG. 7 shows a perforation 11 made in a protrusion 7 after actuation of the blade 9.

The presence of several protrusions 5-8 in various places on the cartridge, and consequently of several locations of perforation, has the advantage of considerably improving the water-coffee mixture inside the cartridge.

The invention is not limited to the examples illustrated.

Any shape of protrusion can be envisaged. The same applies to the distribution and the number of protrusions.

Similarly, any perforating element may be used, e.g. a set of blades at a distance from one another, several pointed elements, etc.

Figure 8:
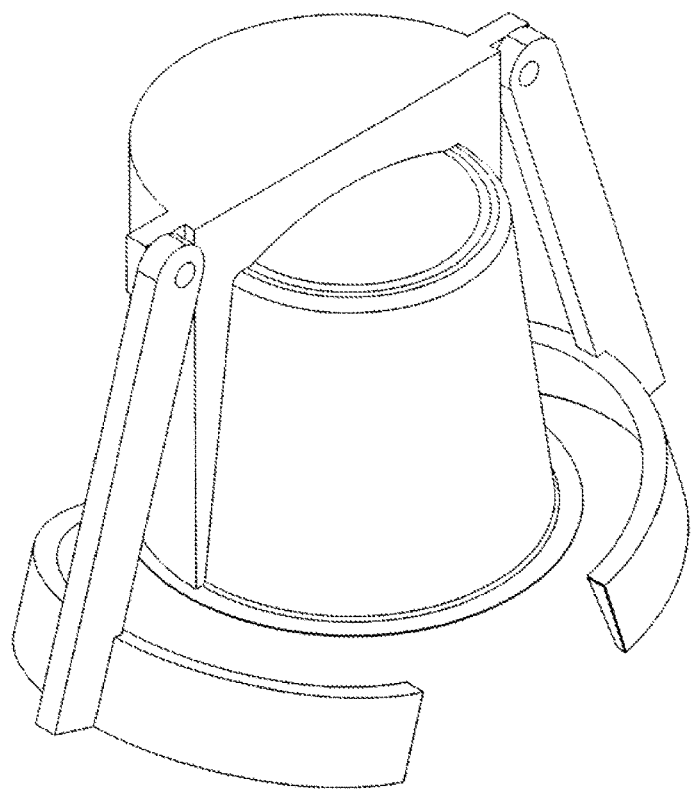
FIGS. 8 and 9 show an example of cartridge cage elongation
Figure 9:
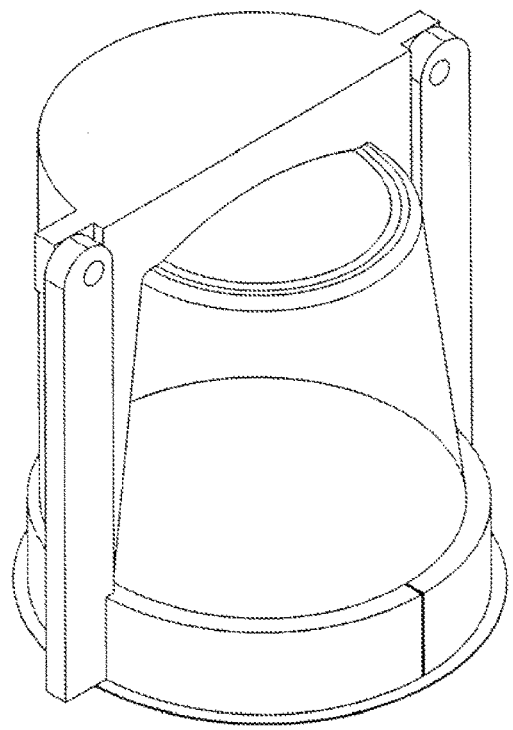

FIGS. 8 and 9 show schematically a first embodiment of cartridge cage elongation.

The elongation illustrated here consists of two pivoting semicircles which are initially at a distance when the cartridge is inserted and then placed in contact when the cartridge is housed in the cage.

Figure 10:
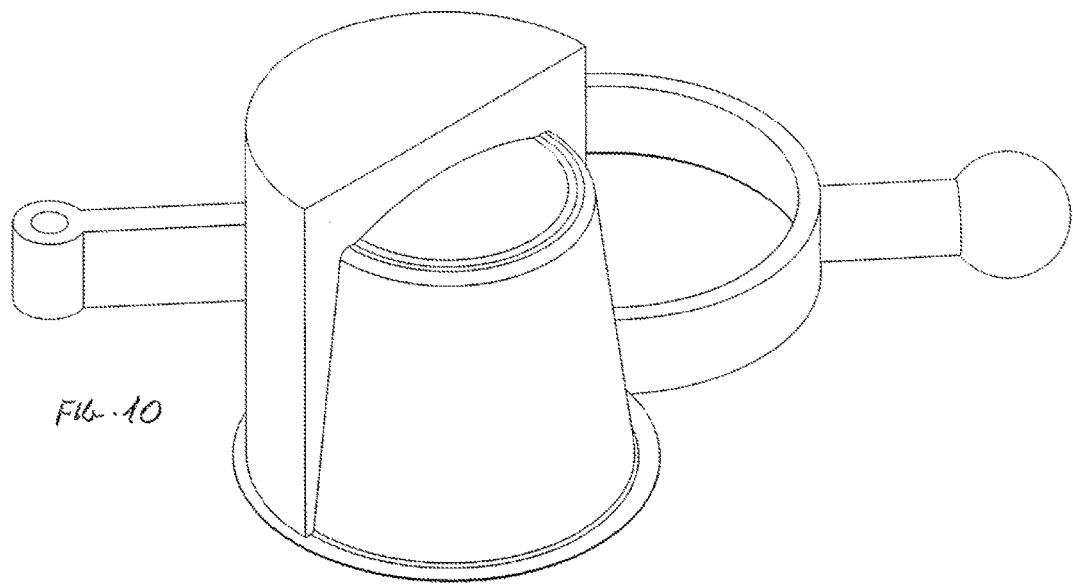
FIGS. 10 and 11 show another example of cartridge cage elongation.
Figure 11:
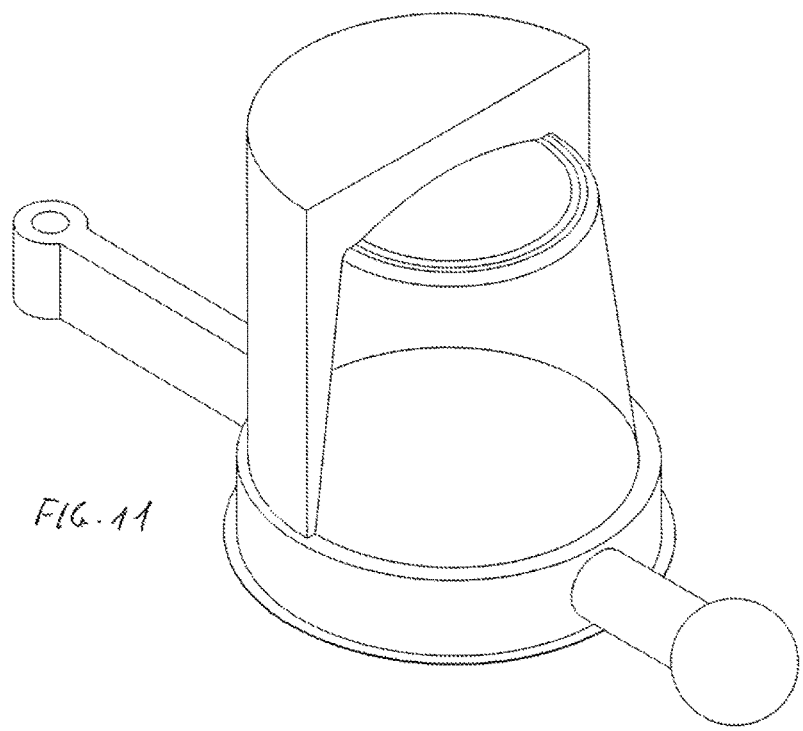

FIGS. 10 and 11 illustrate a second variant of cartridge cage elongation in which the elongation consists of a closed ring which pivots about a vertical axis. The ring is furnished with an actuator.

The invention also relates to a cartridge made of a biodegradable material.

Advantageously, the biodegradable martial may be of plant origin.

According to one variant, the material comprises the following components:

Starch (>70%), fibers, proteins, lipids, glycerin of plant origin, biodegradable resins.

According to another variant, the material comprises the following components:

Starch (>70%), fibers, proteins, lipids, biodegradable resins, mineral colorant.

The invention claimed is:

1. A device for preparing a drink from a cartridge, wherein the device comprises:
   a cartridge housing configured to hold a cartridge, the cartridge having a side wall and an upper face and containing a dose of a drink,
   a water inlet orifice, and
   a circular blade as a perforation element contained inside the cartridge housing, the circular blade being further connected to the water inlet orifice, wherein
   the circular blade is positioned so as to perforate only protrusions protruding from the upper face of the cartridge when the cartridge is placed in the cartridge housing, and wherein
   the device allows translation of the circular blade in a vertical direction in order to perforate the protrusions when the circular blade is lowered.

2. The device as claimed in claim 1, wherein the drink is coffee.

3. The device as claimed in claim 1, wherein the dose is ground coffee.

4. The device as claimed in claim 1, wherein the protrusions of the cartridge are placed only on the upper face thereof, and wherein the circular blade is positioned so as to perforate only the protrusions placed on the upper face of the cartridge when the cartridge is placed in the cartridge housing.

5. A device for preparing a drink comprising:
   a cartridge which comprises a hollow element designed to contain a dose, wherein said hollow element comprises a side wall, an upper face, and a lower face comprising an extraction membrane, wherein said cartridge further comprises several distinct protrusions protruding from said upper face, wherein each protrusion comprises at least one perforation zone having a sharp curvature thereby creating a zone of high pressure when a perforation element is applied to the at least one perforation zone,
   a cartridge housing configured to hold the cartridge,
   a water inlet orifice, and
   a circular blade as a perforation element contained inside the cartridge housing, the circular blade being further connected to the water inlet orifice, wherein
   the circular blade is positioned so as to perforate only the several distinct protrusions protruding from the upper face of the cartridge when the cartridge is placed in the cartridge housing, and wherein
   the device allows translation of the circular blade in a vertical direction in order to perforate the several distinct protrusions when the circular blade is lowered.

6. The device as claimed in claim 5, wherein the drink is coffee.

7. The device as claimed in claim 5 wherein the dose is ground coffee.

8. The device as claimed in claim 5, wherein the several distinct protrusions of the cartridge are placed only on the upper face thereof, and wherein the circular blade is positioned so as to perforate only the several distinct protrusions placed on the upper face of the cartridge when the cartridge is placed in the cartridge housing.

9. A device for preparing a drink comprising:
   a cartridge which comprises a hollow element designed to contain a dose, wherein said hollow element comprises a side wall, an upper face, and a lower face comprising an extraction membrane, wherein said cartridge further comprises several distinct protrusions protruding from said upper face, wherein each protrusion comprises at least one perforation zone;
   a cartridge housing configured to hold the cartridge,
   a water inlet orifice, and
   a circular blade as a perforation element contained inside the cartridge housing, the circular blade being further connected to the water inlet orifice, wherein
   the circular blade is positioned so as to perforate only the several distinct protrusions protruding from the upper face of the cartridge when placed in the cartridge housing, and wherein
   the device allows translation of the circular blade in a vertical direction in order to perforate the several distinct protrusions when the circular blade is lowered.

10. The device as claimed in claim 9, wherein the drink is coffee.

11. The device as claimed in claim 9, wherein the several distinct protrusions of the cartridge are placed only on the upper face thereof, and wherein the circular blade of said device is positioned so as to perforate only the several distinct protrusions placed on the upper face of the cartridge when the cartridge is placed in the cartridge housing.

\* \* \* \* \*